(12) United States Patent
Malmborg et al.

(10) Patent No.: US 11,466,748 B2
(45) Date of Patent: Oct. 11, 2022

(54) VALVE ARRANGEMENT AND METHOD FOR CONTROLLING A PILOT PRESSURE IN A VALVE ARRANGEMENT

(71) Applicant: ÖHLINS RACING AB, Upplands Väsby (SE)

(72) Inventors: Håkan Malmborg, Norrahammar (SE); Fredrik Larsson, Jönköping (SE); Björn Stjärne, Jönköping (SE)

(73) Assignee: ÖHLINS RACING AB, Upplands Väsby (SE)

( * ) Notice: Subject to any disclaimer, the term of this patent is extended or adjusted under 35 U.S.C. 154(b) by 79 days.

(21) Appl. No.: 16/970,162

(22) PCT Filed: Feb. 11, 2019

(86) PCT No.: PCT/EP2019/053299
§ 371 (c)(1),
(2) Date: Aug. 14, 2020

(87) PCT Pub. No.: WO2019/162127
PCT Pub. Date: Aug. 29, 2019

(65) Prior Publication Data
US 2021/0102596 A1 Apr. 8, 2021

(30) Foreign Application Priority Data
Feb. 20, 2018 (EP) .................................... 18157676

(51) Int. Cl.
*F16F 9/34* (2006.01)
*F16F 9/46* (2006.01)

(52) U.S. Cl.
CPC ............. *F16F 9/465* (2013.01); *F16F 9/34* (2013.01); *F16F 9/464* (2013.01); *F16F 2230/24* (2013.01)

(58) Field of Classification Search
CPC .. F16F 9/34–36; F16F 9/46; F16F 9/342–344; F16F 9/465; F16F 9/466
(Continued)

(56) References Cited

U.S. PATENT DOCUMENTS 10,240,656 B2 * 3/2019 Ewers ........................ F16F 9/34
10,364,861 B2 * 7/2019 Ewers ........................ F16F 9/465
(Continued)

FOREIGN PATENT DOCUMENTS

EP 3012482 A1 * 4/2016 ............. F16F 9/465
EP 3012482 A1 4/2016
(Continued)

OTHER PUBLICATIONS

International Search Report and Written Opinion for PCT/EP2019/053299 dated Jul. 12, 2019.

*Primary Examiner* — Christopher P Schwartz
(74) *Attorney, Agent, or Firm* — Bejin Bieneman PLC (57) ABSTRACT

A valve arrangement and a method for controlling a pilot pressure in the valve arrangement for a shock absorber, wherein the valve arrangement comprises a control valve member movable in an axial direction relative a main valve member, a pilot chamber being in fluid communication with a first port and/or a second port. The arrangement and method comprise, during an active control mode, pressure relieving (AM S1) the control valve member and applying an actuating force (AM S2) for controlling the pilot pressure (Pp). Further, during a failsafe control mode, controlling (FM S1) the control valve member by means of the pilot pressure ($P_P$). And finally, during both the active control mode and the failsafe control mode restricting (S3) the pilot fluid flow ($PF_C$, $PF_R$) by at least one common valve seat ($R_2$).

15 Claims, 9 Drawing Sheets

(58) Field of Classification Search
USPC ......... 188/266.2, 266.5, 282.1–282.3, 282.7, 188/282.8; 137/489
See application file for complete search history.

(56) References Cited

U.S. PATENT DOCUMENTS

| | | | | |
|---|---|---|---|---|
| 2009/0288924 A1* | 11/2009 | Murray | ............... | F16F 9/466 |
| | | | | 188/322.13 |
| 2010/0252766 A1* | 10/2010 | Forster | ............... | F16F 9/464 |
| | | | | 251/129.15 |
| 2016/0069471 A1* | 3/2016 | Ewers | ............... | F16K 31/1221 |
| | | | | 137/489 |
| 2017/0234396 A1 | 8/2017 | Hamers et al. | | |

FOREIGN PATENT DOCUMENTS

| | | | | |
|---|---|---|---|---|
| EP | 3115637 A1 | | 1/2017 | |
| EP | 3208489 A1 | * | 8/2017 | ............ F16F 9/466 |

* cited by examiner

VALVE ARRANGEMENT AND METHOD FOR CONTROLLING A PILOT PRESSURE IN A VALVE ARRANGEMENT

CROSS-REFERENCE TO RELATED APPLICATIONS

This application is a national stage of, and claims priority to, Patent Cooperation Treaty Application No. PCT/EP2019/053299, filed on Feb. 11, 2019, which application claims priority to European Application No. EP 18157676.0, filed on Feb. 20, 2018, which applications are hereby incorporated herein by reference in their entireties.

TECHNICAL FIELD

The present disclosure generally relates to the field of valve arrangements. In particular, the present disclosure relates to a valve arrangement for controlling a flow of damping medium in a shock absorber.

BACKGROUND

Generally, within the technical field of shock absorbers that include pilot valves, a pressure regulator, i.e. a valve arrangement, is used to control a flow of damping medium between a compression chamber and a rebound chamber during a reciprocal motion of a piston in a damping medium filled chamber of the shock absorber. The piston, via a piston rod, is connected either to a wheel or a chassis, whereas the chamber is connected to one of the wheel or chassis that the piston is not connected to. During a compression stroke the piston moves axially in a direction towards the compression chamber and thereby pressurizes the damping medium in the compression chamber. During a rebound stroke, the piston moves axially towards the rebound chamber, i.e. in the opposite direction, and thereby pressurizes the damping medium in the rebound chamber. In accordance with the function of the shock absorber, the pressurized damping medium needs to be transferred from the pressurized chamber to the other chamber, i.e. from the compression chamber to the rebound chamber or vice versa. The flow of damping medium needs to be controlled to obtain a damping effect of the piston and thus the shock absorber, i.e. to damp relative motion between the wheel and chassis.

The control of the pressure in the flow of damping medium in the shock absorber depends on the pressure created by a valve arrangement. Pressure regulators in shock absorbers are usually provided with an axially movable or deflectable valve member, such as a washer, cone or shim that acts against a seat part. The pressure control is achieved by equilibrium or balance of forces, for example equilibrium between a pressure and/or flow force acting on the valve member in one direction and counteracting or opposing forces, such as one or more of a spring force, friction force or pilot pressure force acting on the valve member in the opposite direction. When the piston of the shock absorber moves at a certain speed such that the pressure and/or flow force become greater than the opposing or counteracting forces, the movable valve member is forced away from the seat part, thereby opening a flow passage. Thus, the movable valve member is forced to open at a stroke defined as a function of the flow produced by the pressure acting on the regulating area of the pressure regulator.

Traditional valve arrangements of the pressure regulating type described above generally have the disadvantage that when experiencing an electrical or mechanical malfunction to the solenoid or to the control system the valves may be left in an open or closed state; if left in an open state the flow path between the compression chamber and the rebound chamber is opened, resulting in a substantially unrestricted flow of hydraulic fluid between the chambers and consequently substantially no damping force. Alternatively, when the malfunction results in a closed state of the valve, the flow path is substantially closed, resulting in a too high damping force.

State of the art valve arrangements for shock absorbers have a failsafe control mode where a bypass flow allows a predetermined flow of damping medium between the chambers. However, these bypass flows generally provide a damping force that is less adapted to the desired damping characteristics than the active damping.

Therefore, there is a need for a valve arrangement for use in shock absorbers having an improved damping characteristics during failsafe control mode for the chosen application.

SUMMARY

An objective of the present disclosure is to provide an improved valve arrangement having a failsafe control mode with improved damping characteristics.

The disclosure is based on the insight that by forming a valve arrangement wherein the pilot fluid flow is restricted by at least one common restriction both during active control mode and failsafe control mode, improved damping characteristics may be provided in failsafe control mode, since the damping in failsafe control mode will follow the tuning made for the active control mode.

In one example, the objective is achieved by a valve arrangement for a shock absorber, the valve arrangement comprising a valve housing comprising a first and a second port, a pilot chamber being in fluid communication with the first and/or second port. Wherein a pilot pressure is defined by a hydraulic pressure in the pilot chamber, a main valve member is axially movably arranged in the valve housing and being arranged to interact with a main valve seat of the valve housing in order to restrict a main fluid flow between the first and second ports in response to the pilot pressure acting on the main valve member. The arrangement further comprising a control valve member being movable in an axial direction relative the main valve member and being resiliently loaded in a direction towards the pilot chamber. Further, during an active control mode, a pilot fluid flow is controlled in response to an actuating force acting on the control valve member. Finally, during a failsafe control mode, the pilot fluid flow is controlled in response to the pilot pressure acting on the control valve member, and the pilot fluid flow is restricted by at least one common restriction both during active control mode and failsafe control mode.

Hereby, since the pilot fluid flow is restricted by the same valve seat in both active and failsafe control mode, the valve characteristics in failsafe control mode will be follow the characteristics in active control mode. That is, a pressure vs. flow curve during failsafe control mode will follow a pressure vs. flow curve during an active control mode for a selected actuating force. The actuator may be e.g. a solenoid actuator or any other type of force generator.

In one example the control valve member is pressure relieved during the active control mode. Hereby, the pilot regulator is only controlled by the solenoid force.

In one example the control valve member is pressure controlled during the failsafe control mode.

In one example the pilot pressure acting on the control valve member during the failsafe control mode is regulated by a pilot pressure restriction and a spring force from a biasing member resiliently loading a first movable restriction member in a direction towards the pilot chamber.

In one example the valve arrangement further comprises a geometrically defined axial stop for preventing the first movable restriction member from moving axially past the stop in the biasing direction.

In one example the pilot pressure is regulated at a pilot pressure restriction formed between the axial stop and the first movable restriction member.

In one example the actuator has an actuating force range capability enabling a corresponding stroke length of the control valve member. In one example the fed current to the actuator has a range between 0-3 A. In one example such fed current would generate stroke length of about 2-3 mm for the actuator, and/or generate a force range capability of about 0-30N.

In yet one example the pilot pressure acting on the control valve member during the failsafe control mode corresponds to a force which is in an intermediate portion of the actuating force range of the actuator. In one example, the intermediate portion of the actuating force range of the actuator is when the fed current is between about 20% and 80% of the full current capability, e.g. between about 0.6 A and 2.4 A. for a 3 A full capability. In yet one example, the intermediate portion of the actuating force range of the actuator is when the fed current is between about 30% and 70% of the full current capability.

In one example the valve arrangement further comprises a pilot valve member axially movable within the control valve member, the pilot valve member being arranged to interact with a pilot valve arrangement of the control valve member to restrict the pilot fluid flow out from the pilot chamber.

In one example the pilot valve arrangement comprises the first movable restriction member, a second movable restriction member and the biasing member arranged between the first and second restriction members.

In one example the pilot valve arrangement further comprises a sleeve member in which the biasing member is arranged and wherein the sleeve member is axially arranged between the first and second restriction members.

In one example the sleeve member comprises at least two separate parts, fitted together to encapsulate restriction means enabling the common pilot flow restriction and pilot pressure restriction. In one example, the sleeve member comprises three separate parts.

In one example a free length of a biasing member is adapted to bring the control valve member against the axial stop when the actuating force acting on the control valve member is less than a predetermined value.

According to a second aspect of the disclosure, the objectives are achieved by a shock absorbing device for a vehicle suspension comprising: at least one working chamber, and a valve arrangement according to any of above mentioned examples, for controlling the flow of a damping medium fluid to/from the at least one working chamber to control the damping characteristics of the shock absorbing device.

According to a third aspect of the disclosure, the objectives are achieved by a method for controlling a pilot pressure in a valve arrangement for a shock absorber, wherein the valve arrangement comprises a control valve member being movable in an axial direction relative a main valve member, a pilot chamber being in fluid communication with a first port and/or a second port, wherein a pilot pressure is defined by a hydraulic pressure in the pilot chamber. The method comprising the steps of during an active control mode, pressure relieving the control valve member, and applying an actuating force for controlling the pilot pressure. Further, during a failsafe control mode controlling the control valve member by means of the pilot pressure. And finally, during both the active control mode and the failsafe control mode, restricting the pilot fluid flow by at least one common valve seat.

BRIEF DESCRIPTION OF THE DRAWINGS

Further details and aspect of the present disclosure will become apparent from the following detailed description with reference to accompanying drawings.

DETAILED DESCRIPTION

Figure 1:
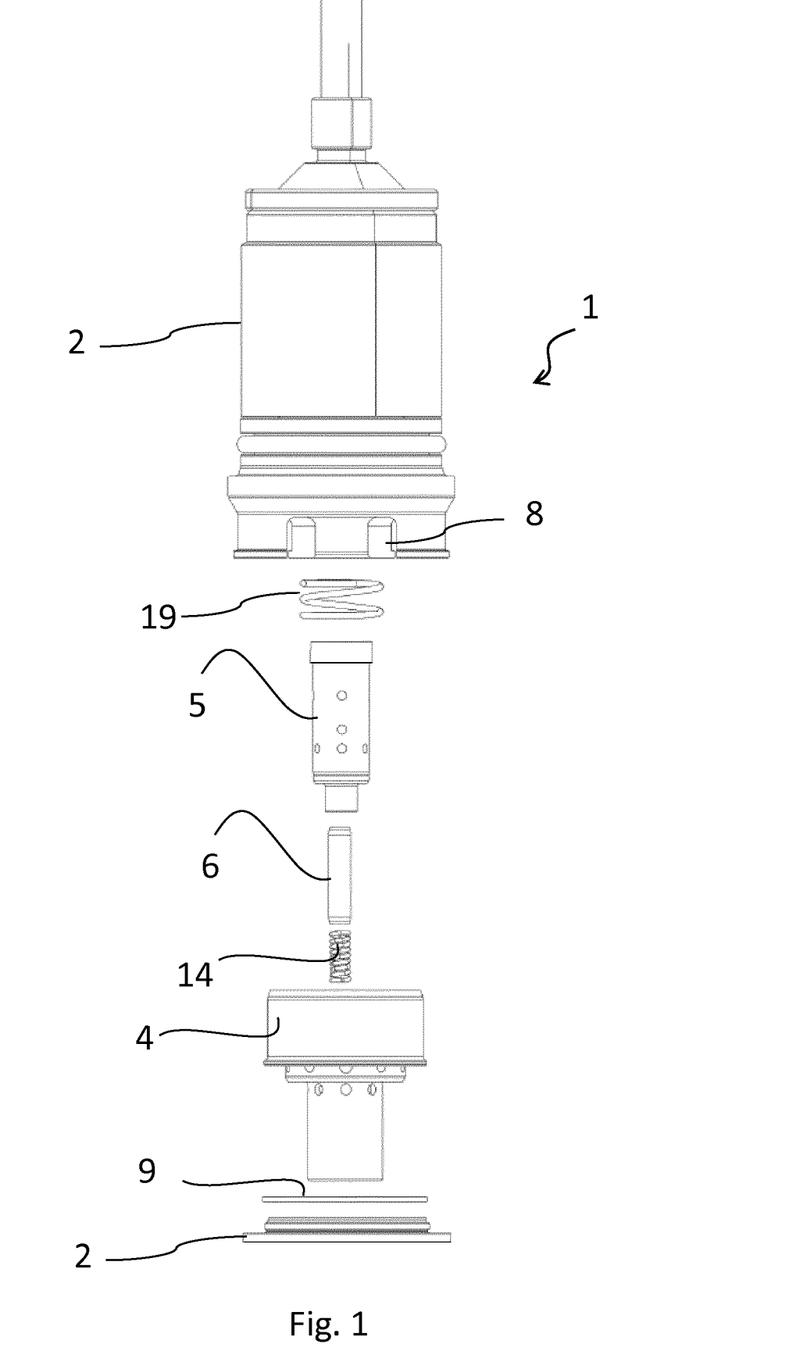
FIG. 1 shows an exploded view of an example of the arrangement.

The first figure, i.e. FIG. 1, illustrates a cross-sectional exploded view of a valve arrangement. This figure is provided to aid the reader in understanding the different parts in the succeeding figures, where more functionalities and flow paths are illustrated. The valve arrangement 1 comprises a valve housing 2. The valve housing has an upper portion at the top of the figure and a lower portion at the bottom of the figure, which are separated in the figure, but when in use they are mechanically coupled, e.g. by press fit or a threaded engagement. The valve housing further comprises a second port 8 in the upper portion 2.

The arrangement further comprises a main valve member 4 and a control valve member 5, inside the control valve member 5 there is a pilot valve member 6 acting as a pressure regulator. The valve members are biased inside the housing by biasing means 14, 19 (illustrated in the example as springs). The biasing means may be any type of springing element providing a suitable spring force and fitting into the housing space.

Figure 4:
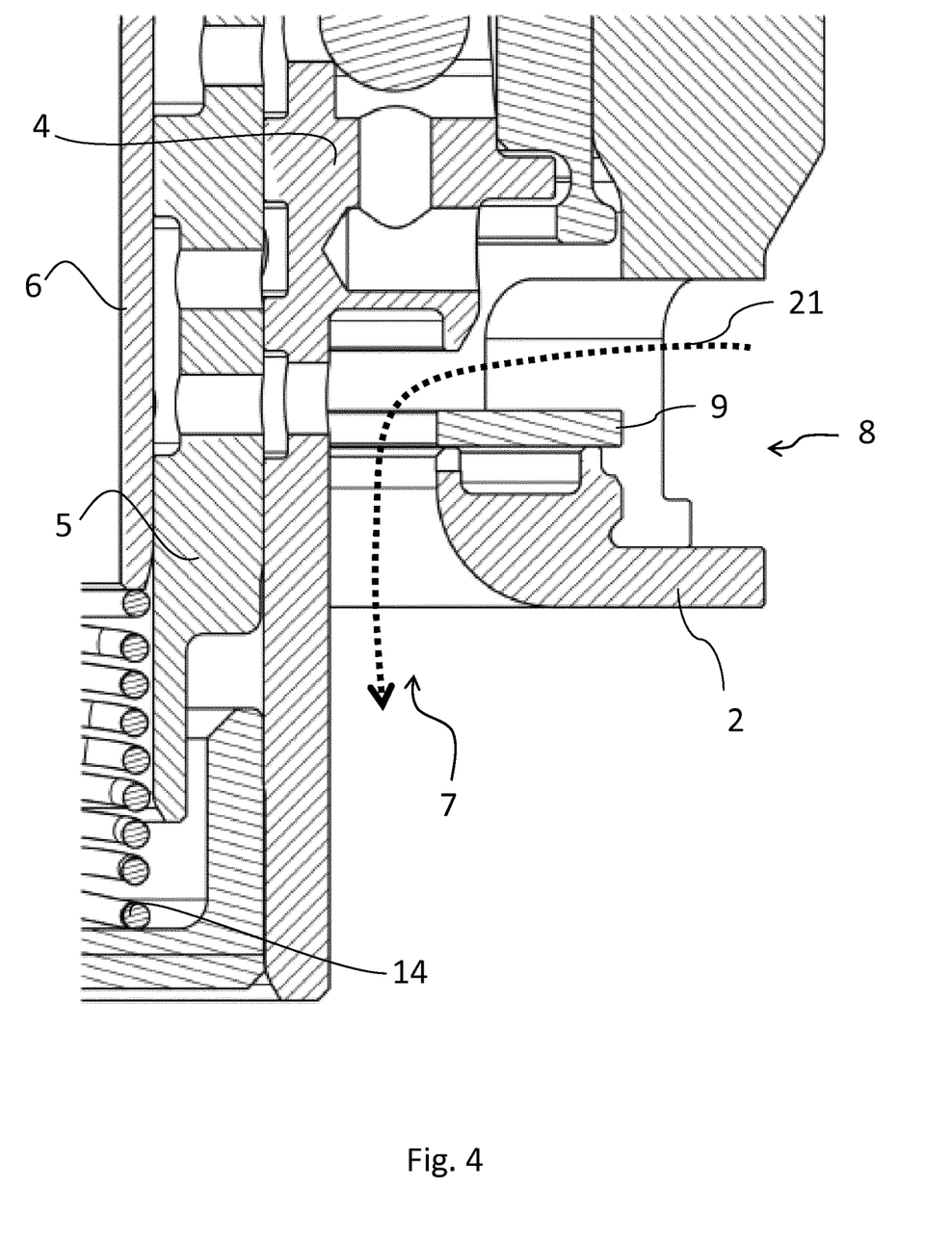
FIG. 4 shows a close up section view of a rebound main fluid flow.
Figure 5:
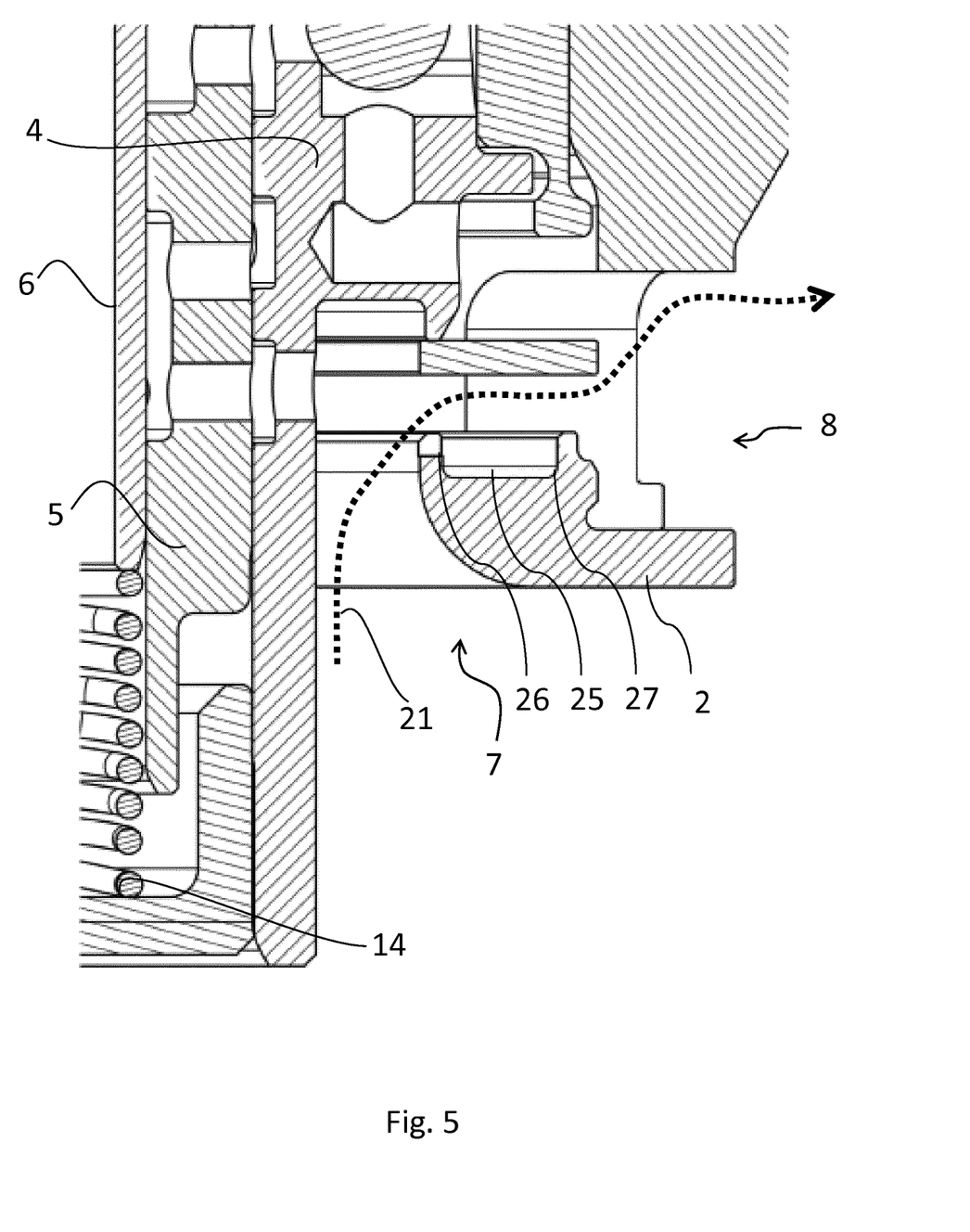
FIG. 5 shows a close up section view of a compression main fluid flow.

Moreover, the arrangement comprises the movable main valve seat member 9, which function is further discussed in relation to FIGS. 4-5.

Figure 2:
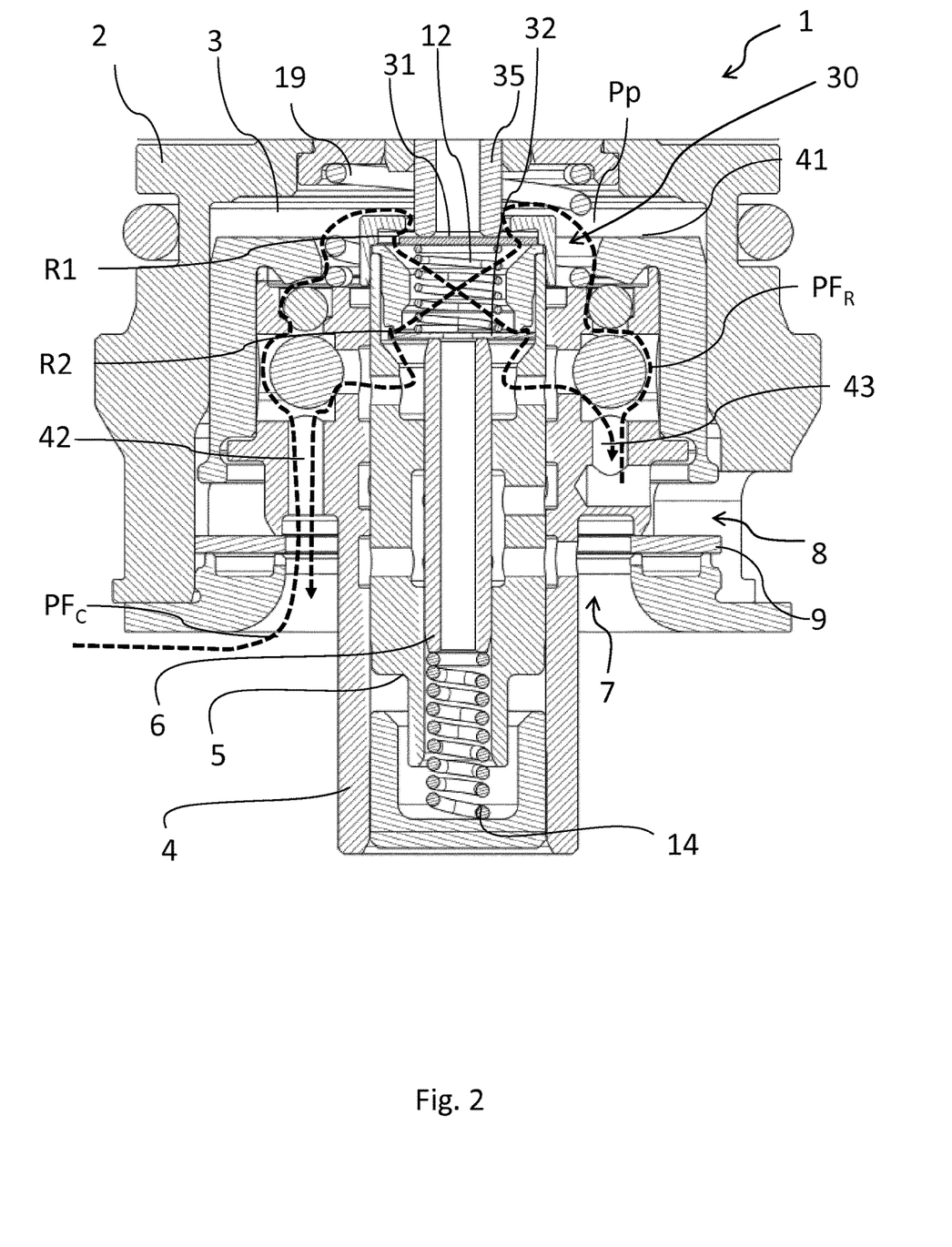
FIG. 2 shows a section view of an example of the valve arrangement in an active control mode.
Figure 3A:
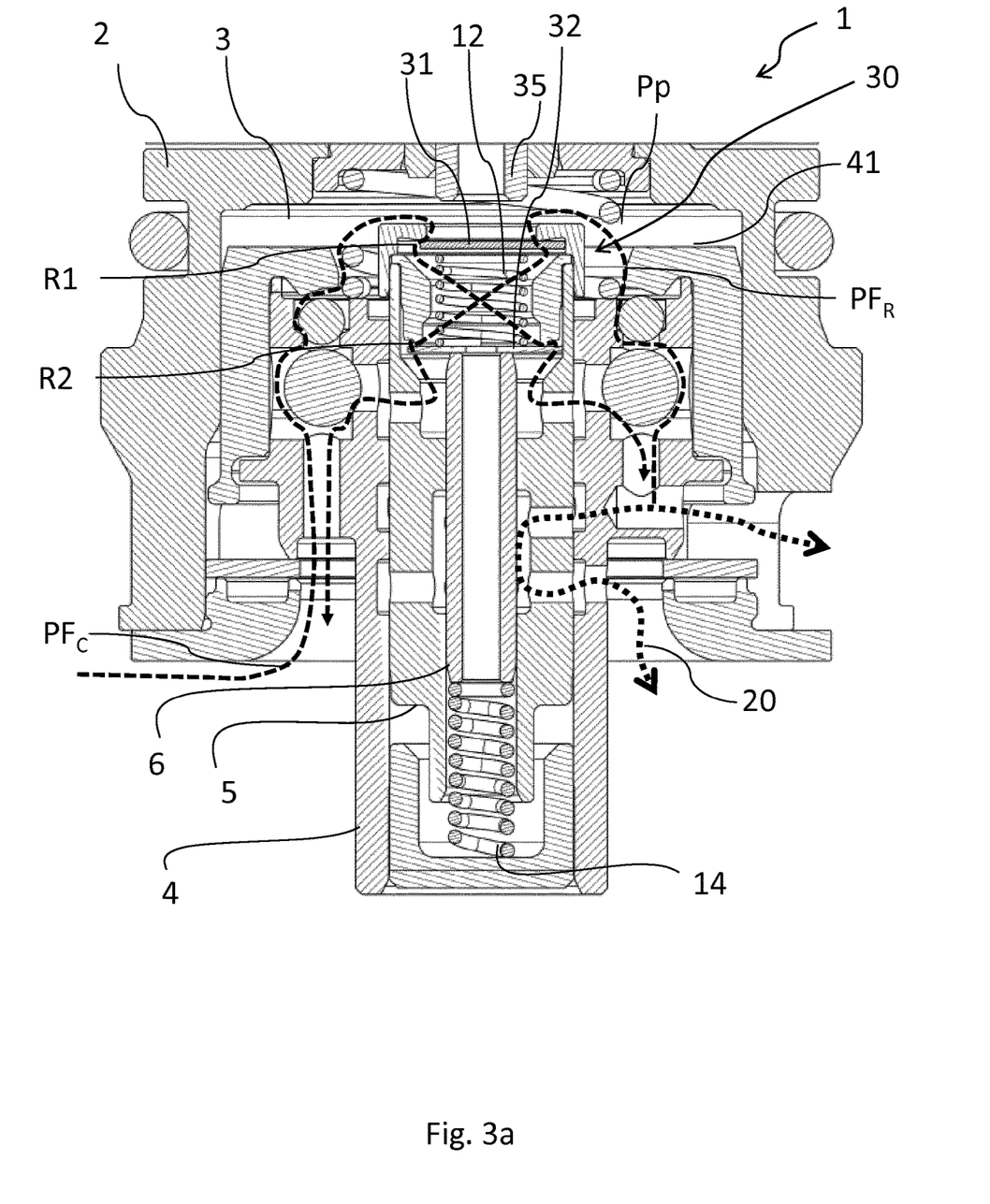
FIG. 3a also shows a section view of a valve arrangement but in a failsafe control mode.

FIG. 2 shows a section view of a valve arrangement in an active control mode. In this mode, the actuator (not shown, but being above the illustration, and being connected to the actuator rod 35) exerts a force via the actuator rod 35 on a pilot valve arrangement 30, which first compress the biasing member 12 and then controls the valve member 5. Hereby, the pilot flow $PF_C PF_R$ is restricted at the common restriction R2 as discussed in the summary of disclosure above. This is also the case during the failsafe control mode, which is illustrated in the subsequent FIG. 3, illustrating the same valve arrangement but in a failsafe control mode, where the actuator rod 35 is retracted in a disengaged state.

FIG. 2 again shows that the valve arrangement comprises a valve housing 2, a pilot chamber 3, a main valve member 4, and a control valve member 5 and a pilot valve member 6. The valve housing 2 comprises a first and a second port 7, 8. In the illustrated example, the first and second ports act as inlet and outlet ports, respectively, for inlet and outlet of hydraulic fluid. The pilot chamber 3 is defined by the space formed between an upper surface of the main valve member 4 and inner walls of the valve housing 2. The pilot chamber 3 is in fluid communication with the first port 7 via a first axial through hole 42 in the main valve member 4 and with the second port 8 via a second axial through hole 43 in the main valve member 4. There may be several axial holes provided in the main valve member for these purposes. There are two flows illustrated by dashed lines in FIG. 2, wherein the first flow $PF_C$ illustrates a pilot fluid flow during compression and the second flow $PF_R$ illustrates the pilot fluid flow during rebound stroke. Moreover, the pilot pressure Pp acting on the upper surface 41 of the main valve member 4 is defined by a hydraulic pressure in the pilot chamber 3. Further, during failsafe mode the pilot pressure Pp is controlled by means of a pilot pressure restriction R1, which is illustrated in the close-up of FIG. 3b.

The main valve member 4 is axially movably arranged in the valve housing 2 and is arranged to interact with the movable main valve seat member 9 in order to restrict or regulate a pressure in a main fluid flow 21 (shown in FIGS. 4 and 5) between the first port 7 and the second port 8 in response to a pilot pressure Pp acting on an upper surface 41 of the main valve member 4. In the illustrated snap shot, the main valve member 4 is held towards the main valve seat member 9 in a closed position. In the closed position only a bleed flow 20 is allowed (shown in FIG. 3a). In FIGS. 4 and 5 two open states are illustrated of the main flow 21. The main valve member may be resiliently loaded by any spring members or may itself be flexible and/or resilient to achieve a desired resilient loading towards the movable main seat valve member 9.

The control valve member 5 is of a substantially cylindrical shape and is arranged coaxially with and at least partially within the main valve member. The control valve member 5 is furthermore movable in an axial direction relative the main valve member in response to an actuating force acting on the control valve member. In this example, the actuating force is transferred by an actuating rod 35. The actuating rod may be an axially movable member on which a solenoid exerts a force in response to an electric current.

Further, the closed state shown in FIG. 2 may be derived from that the pressure from port 7 and/or 8 has not yet reached a threshold value when the main valve member 4 is lifted towards the pilot chamber 3. This threshold value corresponds to when the lifting force generated from the pressure in any one of the first or second port 7, 8 acting on lifting areas of the main valve member 4 exceeds the counter acting force from the pilot pressure Pp in the pilot chamber 3 acting on the upper surface 41 of the main valve member 4.

Figure 3B:
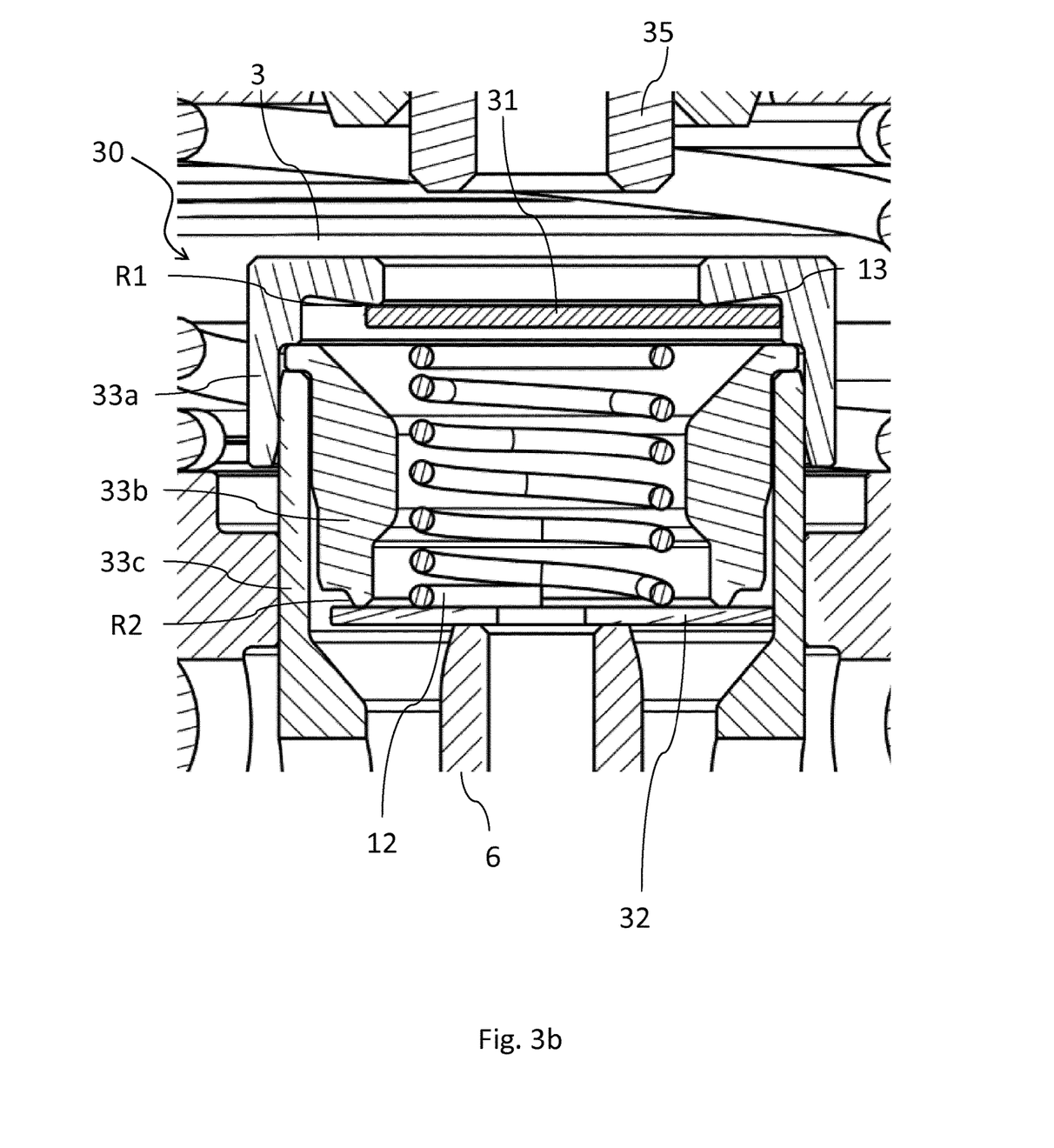
FIG. 3b is a close-up of FIG. 3a, to illustrate the sleeve member in more detail.

Moving on to FIGS. 3a and 3b, the valve arrangement is illustrated in a failsafe control mode in these figures. It is the same valve arrangement in FIGS. 3a and 3b which has already been described in relation to FIG. 2. However, the actuator is in an inactive control mode (retracted position). This is shown by that the actuating rod 35 is in a disengaged position, not affecting the position of the movable valve members.

As most clearly seen in FIG. 3b, the pilot valve arrangement 30 comprises a sleeve member 33 comprising three separate pieces, a top piece 33a, an intermediate piece 33b and a lower piece 33c. The three pieces 33a, 33b, 33c are press fitted together, so that they will not move relative each other during normal use. The three pieces also together encapsulate the biasing member 12, the first movable restriction member 31 and the second movable restriction member 32. The first and second restriction members 31, 32 may be e.g. shims or spacers. This construction allows a first restriction R1, between the circumference of the first restricting member 31 and the top piece 33a. The first restriction R1 controls the pilot pressure Pp in the Pilot chamber 3 during the fail-safe mode (in the active mode, the R1 is opened and consequently the pressure on either side of R1 is substantially the same). Moreover, the construction enables a second restriction R2, between the circumference of the second restricting member 32 and the intermediate piece 33b. This second restriction R2 act as a common restriction in both failsafe and active control mode, and controls the pilot fluid flow.

The axial position of the first restricting member 31 is limited by the top piece 33a of the sleeve member and the intermediate piece 33b of the sleeve member. The axial distance between the first restricting member 31 and the top piece 33a of the sleeve member constitutes the first restriction R1.

In the illustrated example, the free length of the bottom biasing member 14 is adapted to bring the pilot valve member 6 against the axial stop 13 when the actuating force acting on the control valve member is less than a predetermined value. This will at least occur in a failsafe control mode, when there is no current generating a force acting on the control valve member. Further, "bring against" should be read as that the control valve member is directly or indirectly restricted by the axial stop. That is, it is fully possible (as illustrated) that other elements are placed between the control valve member 5 and the axial stop 13, without departing from the term "bring against".

Moving on, FIG. 4 shows a close up section view of a lower right portion of the figure, in which a rebound main fluid flow 21 is illustrated. The main fluid flow 21 is in this case directed from the second port 8 to the first port 7, which holds the movable main valve seat member 9 against the housing 2, and lifts the main valve member 4 upwards. The axial position of the main valve member is in an active state controlled by the solenoid force, as the control valve member 5 is pressure relieved. However, in a failsafe control mode the control valve member 5 is controlled by the pilot pressure and counter acting spring preload from the biasing means 12. This generates a force which is equal to the solenoid force at a specific current, which enables the valve arrangement to have the same damping characteristics at both in the failsafe control mode and the active control mode. During rebound flow illustrated in FIG. 4, the movable main valve seat member 9 rests on the housing 2 and acts as seat. However, during the compression flow as illustrated in FIG. 5, and described more in detail below, the movable main valve seat member 9 is held upwards against the main valve member 4 and acts valve member together with the main valve member 4, as they move in tandem.

FIG. 5 shows the same close up section view as in FIG. 4, but in which a compression main fluid flow 21 is illustrated. In this position the valve arrangement is adapted to allow a regulated main flow 21 from the first port 7 to the second port 8, i.e. a flow during compression stroke. The compression main fluid flow will lift and hold the movable main valve seat member 9 into an upper position against the main valve member 4. This allows the flow to pass a circumferential aperture 25 (of the valve housing 2), having a radial inner wall 26 and a radial outer wall 27. The aperture and two walls constitutes (together with the movable main valve seat member 9) two serial and cooperative restrictions used to regulate the flow which provides a soft opening in compression stroke.

Figure 6A:
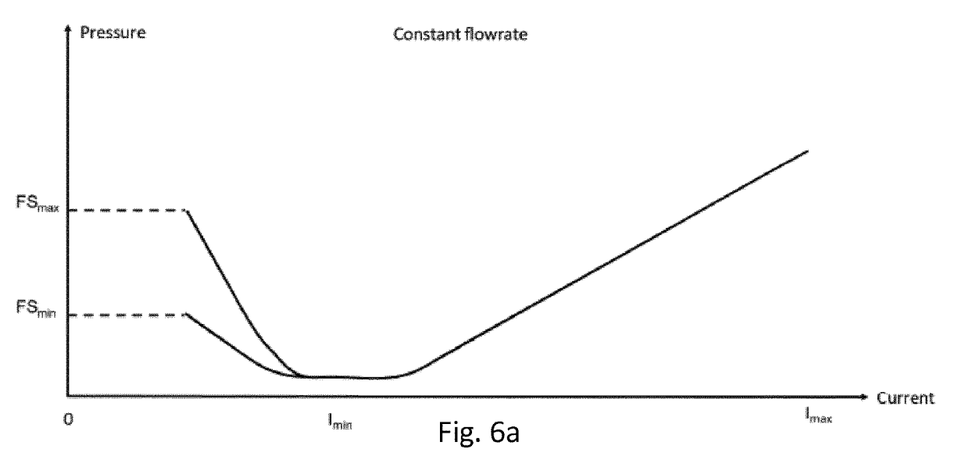
FIG. 6a shows a graph of the pressure at a constant failsafe flowrate.
Figure 6B:
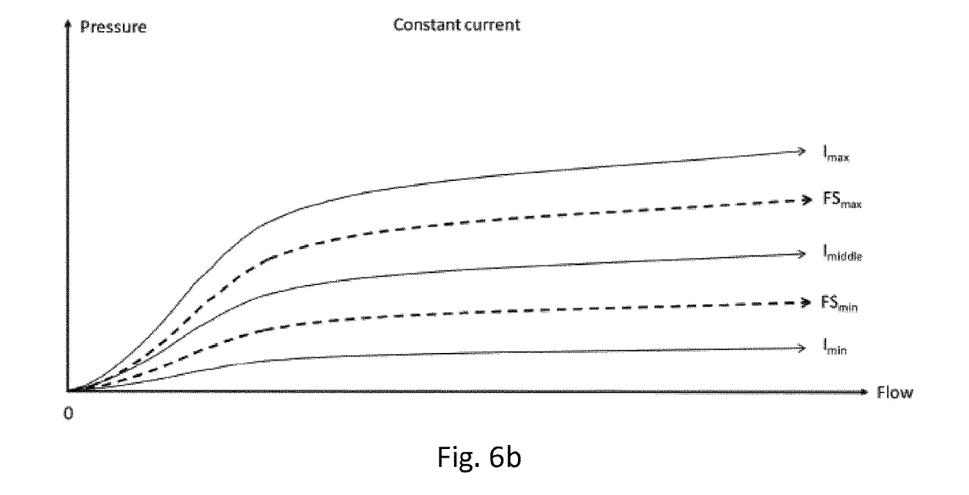
FIG. 6b shows a graph of the pressure range for a number of different constant currents.

Moving on to FIG. 6a and FIG. 6b, showing graphs of the pilot pressure at a constant flowrate (in FIG. 6a) and at a few constant current levels (in FIG. 6b). The pressure vs. flow in FIG. 6b is illustrated during a compression stroke, with a soft opening (soft transition between the exponentially increase to the linear increase of pressure relative flow), however the curve in rebound flow will be principally the same, but without the soft opening characteristic. Further, for FIG. 6a, the pressure vs current graph is applicable for both compression and rebound flow.

FIG. 6a shows two extreme failsafe control mode configurations (indicating the range in which the failsafe should be configured). FSmax being a maximum pilot pressure during failsafe control mode and FSmin being the minimum pilot pressure during failsafe control mode. Further, FIG. 6a shows that the pressure will vary dependent on the fed current to the actuator when the flow is kept constant. This indicates that when the fed current goes below a threshold value, the pressure will increase at a constant flow, so as to create a failsafe damping characteristic which corresponds to a specific fed current (chosen somewhere within the range of FSmax and FSmin).

This function is also shown in FIG. 6b, but where the graph shows that the fluid pressure will increase with the fluid flow for a constant current. Each of the three curves Imax, Imiddle and Imin in FIG. 6b represents a fed current to the actuator. Imax, being the top curve, represents a maximum current being fed to the solenoid, e.g. 3.0 A. For this current, the pressure will increase fairly steep (exponentially) in the beginning of the curve, typically during the bleed flow 20, and thereafter with a relatively low linear increase once the main fluid flow 21 is opened. The other two curves Imiddle, Imin follow the same principle but with less pressure for the same flow, as the fed current is lower and therefore also the actuating force. Further, as seen in the figure, the two failsafe curves FSmax and FSmin indicate the pressure range in which the failsafe control mode may be configured. Thus, the failsafe control mode may hereby present a damping characteristic which follows a pilot pressure acting on the control valve member that corresponds to a force which is in an intermediate portion of the actuating force range of the actuator, as has been discussed above.

Figure 7:
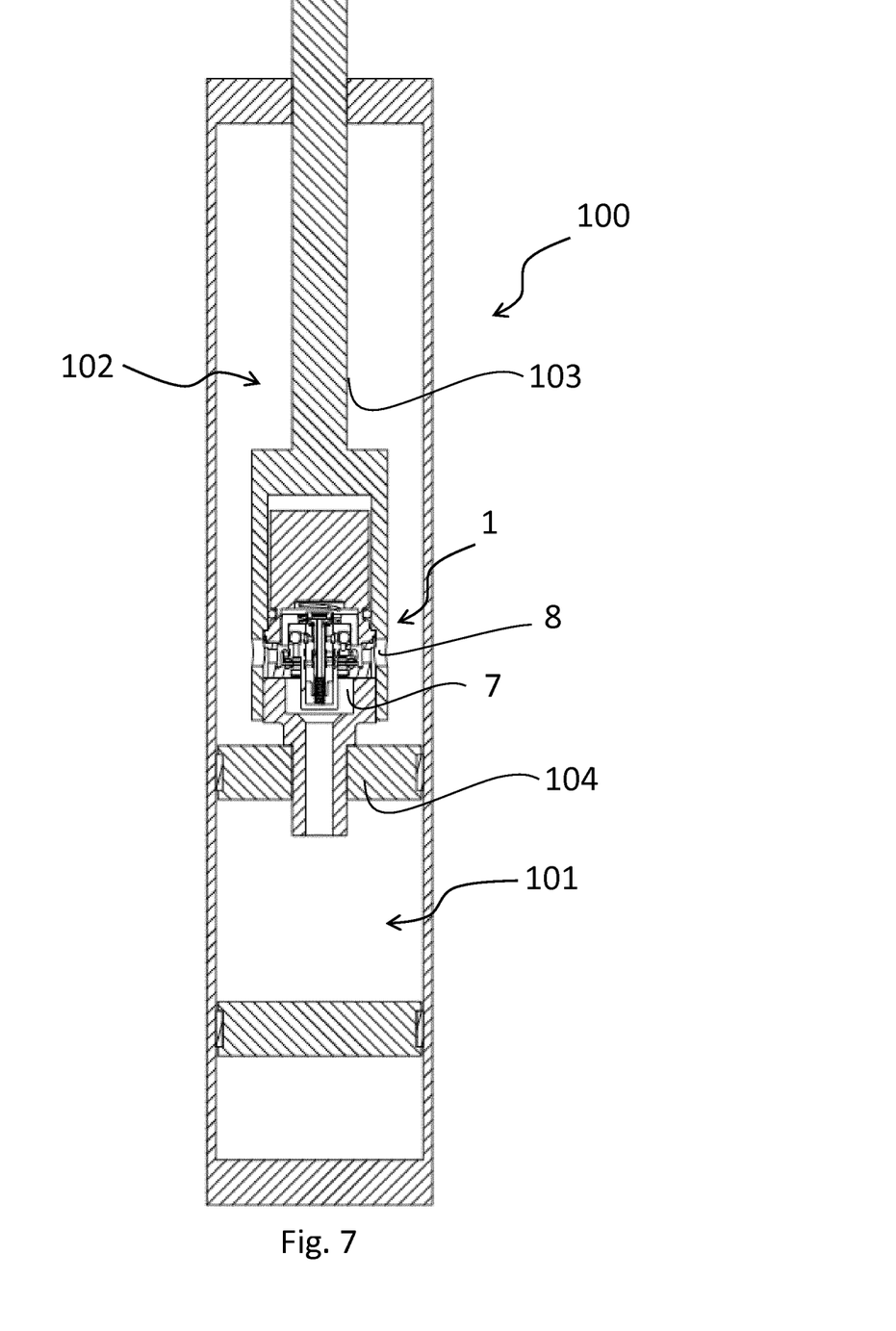
FIG. 7 shows a section view of a shock absorbing device comprising a valve arrangement therein.
Figure 8:
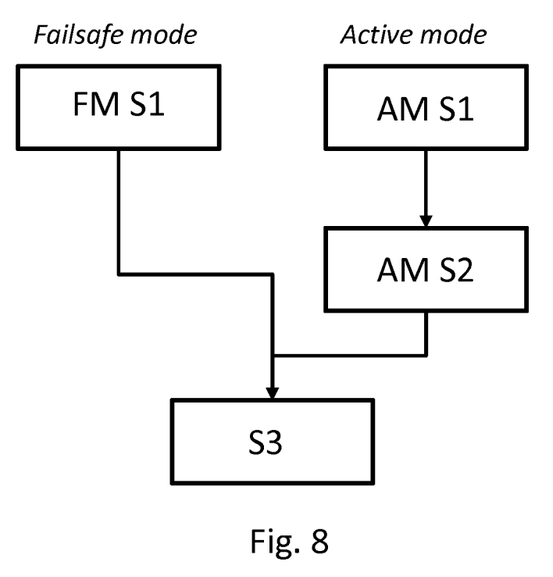
FIG. 8 shows schematic overview of the method steps according to one example.

FIG. 7 shows a side cross-sectional illustration of a shock absorber 100 having a valve arrangement 1 according to any of the above mentioned examples placed therein. Not all the details of the shock absorber are shown, instead FIG. 8 is merely an illustration to show in what way the valve arrangement described herein may be implemented in a shock absorber. The shock absorber comprises a first working chamber 101 and a second working chamber 102. Further, the shock absorber 100 comprises a piston rod 103 attached to the housing of the valve arrangement 1. A sealing member 104 is arranged to the valve housing and divides the first working chamber 101 from the second working chamber 102. The first working chamber 101 is fluidly connected to the first port 7 of the valve arrangement and the second working chamber 102 is fluidly connected to the second port 8 of the valve arrangement 1. It should be further understood that the shock absorber in FIG. 1 also illustrates how a valve arrangement 1 would be mounted in e.g. a front fork or equivalent damping equipment for a vehicle. It is further understood that the sealing member 104 may have one or several parallel or serial passive or active valves to complement the flow restriction of the valve arrangement 1 described herein.

Finally, FIG. 8 illustrates the method for controlling a pilot pressure in a valve arrangement 1 for a shock absorber 100. The method may be carried out by means of a valve arrangement according to any of the above mentioned examples. Such arrangement may comprise a control valve member 5 being movable in an axial direction relative a main valve member, a pilot chamber 3 being in fluid communication with a first port 7 and/or a second port 8. Further a pilot pressure Pp is defined by a hydraulic pressure in the pilot chamber. The illustrated method comprise two legs, an active control mode and an failsafe control mode. Although both legs will not be carried out at the same time, it is to be understood that both legs must be possible to achieve in with the same system in order or be able to carry out the last common step of the two legs. The illustration further comprise two steps during an active control mode, namely pressure relieving AM S1 the control valve member 5, and applying an actuating force AM S2 for controlling the pressure on the control valve member 5. Further, during a failsafe control mode, the method comprise the step of controlling FM S1 the control valve member by means of a pilot pressure PP acting on the control valve member. Finally, during both the active control mode and the failsafe control mode the final step is to restrict S3 the pilot fluid flow $PF_C$, $PF_R$ by at least one common valve seat $R_2$.

Although exemplary examples of the present disclosure have been shown and described, it will be apparent to the person skilled in the art that a number of changes and modifications, or alterations of the disclosure as described herein may be made. Moreover, the different examples described above may be combined in different ways without departing from the scope of the inventive concept. Thus, it is to be understood that the above description of the disclosure and the accompanying drawing is to be regarded as a non-limiting example thereof and that the scope of the disclosure is defined in the appended patent claims.

The invention claimed is:

1. A valve arrangement for a shock absorber comprising:
   a valve housing including a first and a second port;
   a pilot chamber in fluid communication with one of the first and second port, wherein a pilot pressure ($P_P$) is defined by a hydraulic pressure in the pilot chamber;
   a main valve member axially movably in the valve housing and being arranged to interact with a main valve seat of the valve housing in order to restrict a main fluid flow between the first and second ports in response to the pilot pressure acting on the main valve member;
   a control valve member being movable in an axial direction relative to the main valve member and being resiliently loaded in a direction towards the pilot chamber,
   wherein the valve arrangement is configured so that during an active control mode, a pilot fluid flow ($PF_C$, $PF_R$) is controlled in response to an actuating force acting on the control valve member, during a failsafe control mode, the pilot fluid flow ($PF_C$, $PF_R$) is controlled in response to the pilot pressure acting on the control valve member, and in that the pilot fluid flow ($PF_C$, $PF_R$) is restricted by at least one common restriction (R2) both during active control mode and failsafe control mode.

2. The valve arrangement according to claim 1, further comprising a pilot valve member axially movable within the control valve member, the pilot valve member being arranged to interact with a pilot valve arrangement of the control valve member to restrict the pilot fluid flow ($PF_C$, $PF_R$) out from the pilot chamber.

3. The valve arrangement according to claim 2, wherein the pilot valve arrangement comprises a first movable restriction member, a second movable restriction member and a biasing member arranged between the first and the second restriction members.

4. The valve arrangement according to claim 3, wherein the pilot valve arrangement further comprises a sleeve member in which the biasing member is arranged and wherein the sleeve member is axially arranged between the first and the second restriction members.

5. The valve arrangement according to claim 4, wherein the sleeve member comprises at least two separate parts, fitted together to encapsulate a restrictor enabling the common pilot flow restriction (R2) and pilot pressure restriction.

6. The valve arrangement according to claim 1, wherein the pilot pressure acting on the control valve member during the failsafe control mode is regulated by a first restriction ($R_1$) and a spring force from a biasing member resiliently loading a first movable restriction member in a direction towards the pilot chamber.

7. The valve arrangement according to claim 6, wherein the valve arrangement further comprises a geometrically defined axial stop for preventing the first movable restriction member from moving axially past the stop in the biasing direction.

8. The valve arrangement according to claim 7, wherein the pilot pressure is regulated at a pilot pressure restriction (R1) formed between the axial stop and the first movable restriction member.

9. A valve arrangement according to claim 7, wherein a free length of a biasing member is adapted to bring the control valve member against the axial stop when the actuating force acting on the control valve member is less than a predetermined value.

10. The valve arrangement according to claim 1, wherein the control valve member is pressure relieved during the active control mode.

11. The valve arrangement according to claim 10 wherein the control valve member is pressure controlled during the failsafe control mode.

12. The valve arrangement according to claim 1, wherein an actuator has an actuating force range capability enabling a stroke length of the control valve member.

13. The valve arrangement according to claim 12, wherein the pilot pressure acting on the control valve member during the failsafe control mode corresponds to a force which is in an intermediate portion of the actuating force range of the actuator.

14. A valve arrangement for a shock absorber comprising:
a valve housing including a first and a second port;
a pilot chamber in fluid communication with one of the first and second port, wherein a pilot pressure ($P_P$) is defined by a hydraulic pressure in the pilot chamber;
a main valve member axially movably in the valve housing and being arranged to interact with a main valve seat of the valve housing in order to restrict a main fluid flow between the first and second ports in response to the pilot pressure acting on the main valve member;
a control valve member being movable in an axial direction relative to the main valve member and being resiliently loaded in a direction towards the pilot chamber,
wherein the valve arrangement is configured so that during an active control mode, a pilot fluid flow ($PF_C$, $PF_R$) is controlled in response to an actuating force acting on the control valve member, during a failsafe control mode, the pilot fluid flow ($PF_C$, $PF_R$) is controlled in response to the pilot pressure acting on the control valve member, and in that the pilot fluid flow ($PF_C$, $PF_R$) is restricted by at least one common restriction (R2) both during active control mode and failsafe control mode, wherein the pilot pressure acting on the control valve member during the failsafe control mode is regulated by a first restriction ($R_1$) and a spring force from a biasing member resiliently loading a first movable restriction member in a direction towards the pilot chamber.

15. A valve arrangement for a shock absorber comprising:
a valve housing including a first and a second port;
a pilot chamber in fluid communication with one of the first and second port, wherein a pilot pressure ($P_P$) is defined by a hydraulic pressure in the pilot chamber;
a main valve member axially movably in the valve housing and being arranged to interact with a main valve seat of the valve housing in order to restrict a main fluid flow between the first and second ports in response to the pilot pressure acting on the main valve member;
a control valve member being movable in an axial direction relative to the main valve member and being resiliently loaded in a direction towards the pilot chamber, wherein the valve arrangement is configured so that during an active control mode, a pilot fluid flow ($PF_C$, $PF_R$) is controlled in response to an actuating force acting on the control valve member, during a failsafe control mode, the pilot fluid flow ($PF_C$, $PF_R$) is controlled in response to the pilot pressure acting on the control valve member, and wherein the pilot fluid flow ($PF_C$, $PF_R$) is restricted by at least one common restriction (R2) both during active control mode and failsafe control mode,
further comprising a pilot valve member axially movable within the control valve member, the pilot valve spool being arranged to interact with a pilot valve arrangement of the control valve member to restrict the pilot fluid flow ($PF_C$, $PF_R$) out from the pilot chamber, and wherein the pilot valve arrangement comprises the first movable restriction member, a second movable restriction member and a biasing member arranged between the first and the second restriction members.

* * * * *